United States Patent
Pursifull et al.

(10) Patent No.: US 9,638,144 B2
(45) Date of Patent: May 2, 2017

(54) SYSTEMS AND METHODS FOR FUEL VAPOR CANISTER PURGING

(71) Applicant: Ford Global Technologies, LLC, Dearborn, MI (US)

(72) Inventors: Ross Dykstra Pursifull, Dearborn, MI (US); Meisam Mehravaran, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 14/751,900

(22) Filed: Jun. 26, 2015

(65) Prior Publication Data

US 2016/0377031 A1   Dec. 29, 2016

(51) Int. Cl.
| | | |
|---|---|---|
| F02M 1/00 | (2006.01) | |
| F02M 25/08 | (2006.01) | |
| F02B 37/18 | (2006.01) | |

(52) U.S. Cl.
CPC ....... F02M 25/0836 (2013.01); F02B 37/183 (2013.01)

(58) Field of Classification Search
CPC ............ F02D 2250/02; F02M 25/0836; F02M 35/042; F02M 35/1211
USPC ... 123/516–520, 559.1, 564, 184.53, 184.54, 123/184.58, 184.59
See application file for complete search history.

(56) References Cited

U.S. PATENT DOCUMENTS

| | | | |
|---|---|---|---|
| 7,918,214 B2 | 4/2011 | Kerns et al. | |
| 8,132,560 B2 | 3/2012 | Ulrey et al. | |
| 8,583,351 B2 | 11/2013 | Ulrich et al. | |
| 8,783,231 B2 | 7/2014 | Leone | |
| 2013/0263590 A1 | 10/2013 | Kempf et al. | |
| 2013/0333665 A1* | 12/2013 | Pursifull | F02B 37/04 123/399 |
| 2014/0116399 A1 | 5/2014 | Ulrey et al. | |
| 2015/0101564 A1* | 4/2015 | Surnilla | F02D 43/00 123/294 |
| 2015/0204283 A1* | 7/2015 | VanDerWege | F02M 35/10144 123/445 |
| 2016/0201612 A1* | 7/2016 | Pursifull | F02M 25/089 123/520 |

* cited by examiner

*Primary Examiner* — John Kwon
(74) *Attorney, Agent, or Firm* — Julia Voutyras; McCoy Russell LLP

(57) ABSTRACT

Methods and systems are provided for purging a fuel vapor canister. In one example, a method may include during boosted engine operating conditions, utilizing regulated compressed air from an engine intake to purge fuel vapors stored in the fuel vapor canister. Further, during non-boosted condition, regulated air from the intake may be utilized to purge the fuel vapor canister. The purged fuel vapors and intake air may be delivered to upstream of a compressor when operating with boost, or to an intake manifold when operating without boost.

20 Claims, 9 Drawing Sheets

FIG. 10

| | | Purging | | | Fuel vapor storage and refueling | EVAP leak test |
|---|---|---|---|---|---|---|
| | During boosted conditions (compressed air) | During non-boosted conditions | | | | |
| | | With intake air | With ambient air | | | |
| Embodiments 100, 200, and 300 (FIGS. 1, 2, and 3 respectively) | Open CPV<br>Close CVV<br>Close VBV | Open CPV<br>Close CVV<br>Close VBV | Open CPV<br>Open CVV<br>Close VBV<br>(Embodiments 2 and 3 do not enable purging with ambient air) | Close CPV<br>Open CVV<br>Open VBV | Close CPV<br>Close CVV<br>Close VBV |
| Embodiment 400 (FIG. 4) | Open CPV<br>Close CVV<br>Close VBV<br>Adjust three way valve to couple canister to purge conduit | Open CPV<br>Close CVV<br>Close VBV<br>Adjust three way valve to couple canister to purge conduit | Purging with ambient air is not enabled | Close CPV<br>Open CVV<br>Open VBV<br>Adjust three way valve to couple canister to vent line | Close CPV<br>Close CVV<br>Close VBV<br>Adjust three way valve to couple canister to vent line |
| Embodiment 500 (FIG. 5) | Open CPV<br>Close CVV<br>Close VBV<br>Adjust three way valve to couple canister to first intake passage | Open CPV<br>Close CVV<br>Close VBV<br>Adjust three way valve to couple canister to first intake passage | Open CPV<br>Open CVV<br>Close VBV<br>Adjust three way valve to couple canister to atmosphere | Close CPV<br>Open CVV<br>Open VBV<br>Adjust three way valve to couple canister to atmosphere | Close CPV<br>Close CVV<br>Close VBV<br>Adjust three way valve to couple canister to atmosphere |

SYSTEMS AND METHODS FOR FUEL VAPOR CANISTER PURGING

FIELD

The present description relates generally to methods and systems for purging of fuel vapors stored in a fuel vapor canister of an evaporative emissions system.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system may allow the fuel vapors to be purged into the engine intake manifold for use as fuel. For example, vacuum generated by the intake manifold during engine spinning may be used to draw fresh air through the fuel vapor canister to purge the stored fuel vapors into the intake manifold.

However, when an engine is boosted, it may be more difficult to purge fuel vapors from the fuel vapor canister. For example, during boosted engine operating conditions, the intake manifold pressure may be too high to generate a desired amount of flow from the fuel vapor canister to the intake manifold. Various approaches for purging a fuel vapor canister in boosted engines are known. In one example approach, fuel vapor purging during boosted conditions is carried out by utilizing one or more ejectors to generate the vacuum required for drawing fresh air through the canister. During non-boosted conditions, the fuel vapor canister is purged with fresh air by utilizing the intake vacuum.

However, the inventors herein have identified several disadvantages with such an approach. For example, due to the use of ejectors, system complexity and cost are increased. Further, during purging, some of the fresh air utilized for desorbing the stored fuel vapors is injected into the intake along with the desorbed fuel vapors. Consequently, an air-fuel ratio of the engine is altered. For example, when additional external air is introduced during purging, the amount of air entering the engine cylinders may increase. Consequently, an amount of fuel injected is increased in order to maintain the exhaust air-fuel ratio near stoichiometry. As a result, fuel consumption is increased. Further, due to increased air-flow to the engine, the resulting engine torque output may be greater than requested by the vehicle operator. In order to compensate for increased torque due to the increased airflow, a vehicle controller may adjust one or more engine actuators (e.g., retard spark timing from MBT) to reduce torque. Such measures for torque compensation may degrade the engine efficiency.

In one example, some of the above issues may be at least partly addressed by a method for a boosted engine, comprising: during purging a fuel vapor canister, during a boosted condition, flowing compressed air from a first intake passage downstream of a compressor into the canister, and delivering the purge gases to a second intake passage upstream of the compressor; and during a non-boosted condition, flowing intake air from the first intake passage into the canister, and delivering purge gases from the canister to an engine intake manifold. In this way, by purging a fuel vapor canister with air from the intake during both boosted and non-boosted conditions, a desired combustion air-fuel ratio may be maintained.

As an example, when fuel vapor purging conditions are met, the engine is operating with boost, pressure difference across the compressor may be utilized to direct compressed intake air from a first intake passage downstream of the compressor and upstream of an intake throttle into the canister and then deliver purge gases including desorbed fuel vapors and intake air from the canister to a second intake passage upstream of the compressor. If the engine is operating without boost, intake manifold vacuum may be utilized to direct intake air from the first intake passage into the canister, and then deliver purge gases from the canister to an intake manifold downstream of the engine. Further, during both non-boosted and boosted conditions, the flow of intake air from the first intake passage to the canister may be regulated by a pressure regulator in order to regulate a pressure of intake air delivered to the canister for purging. Still further, during both boosted and non-boosted conditions, the purge flow (including flow of intake air and flow of purge gases) may be directed via a common path (starting from the first intake passage, passing through the canister, and then through a purge conduit including a purge valve) until a node is reached at the end of the purge conduit and downstream of the purge valve. During boosted conditions, the flow at the node may be directed to the second intake passage upstream of the compressor via a second purge conduit. During non-boosted conditions, the flow at the node may be directed to the intake manifold downstream of the throttle via a third purge conduit.

In this way, by utilizing air from the intake to purge a fuel vapor canister during both boosted and non-boosted conditions addition of external air to the intake manifold during purging may be reduced. Consequently, a desired air-fuel ratio may be maintained. As a result, engine efficiency may be improved. Further, by eliminating the use of additional ejectors and pumps for purging, system complexity is reduced. Still further, by regulating air flow through the canister, additional structural reinforcements for the canister may not be required. As a result, system cost is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 10 shows a table indicating positions of one or more valves of the evaporative emissions control system during various modes of engine operation, according to different embodiments of the present disclosure.

DETAILED DESCRIPTION

The following description relates to systems and methods for purging a fuel vapor canister in a vehicle system, such as the vehicle system of FIGS. 1-5, which illustrate different embodiments of the present disclosure. Specifically, the description involves utilizing air from an engine intake system for purging during different modes of engine operation. During a boosted condition, the canister is purged with compressed air from an intake passage downstream of a compressor, and the purge gases are delivered upstream of the compressor. During a non-boosted condition, the canister is purged with air from the intake passage, and the purge gases are delivered to the intake manifold. Further, during selected non-boosted conditions, the canister is purged with ambient air. A controller, such as controller 12 at FIGS. 1-5 may be configured to perform control routines according to the method of FIGS. 6-9 to purge the fuel vapor canister during the different modes of engine operation. Specifically, during boosted engine operating conditions, the controller may perform a control routine according to the method of FIG. 7 to purge the fuel vapor canister with compressed intake air. During non-boosted conditions, the controller may perform a control routine according to the method of FIG. 8 to purge the fuel vapor canister with intake air. Furthermore, during selected non-boosted conditions, the controller may perform a control routine according to the method of FIG. 9 to purge the fuel vapor canister with fresh ambient air. In this way, by utilizing intake air to purge the fuel vapor canister during both boosted and non-boosted conditions, introduction of ambient air into the intake manifold during purging may be reduced. Consequently, by purging with air from the intake system, the technical effect of maintaining a desired air-fuel ratio, and hence improved engine efficiency during purging may be achieved. An example table indicating adjustment of positions of one or more valves during various modes of engine operation, and according to different embodiments of the present disclosure is shown at FIG. 10.

Figure 1:
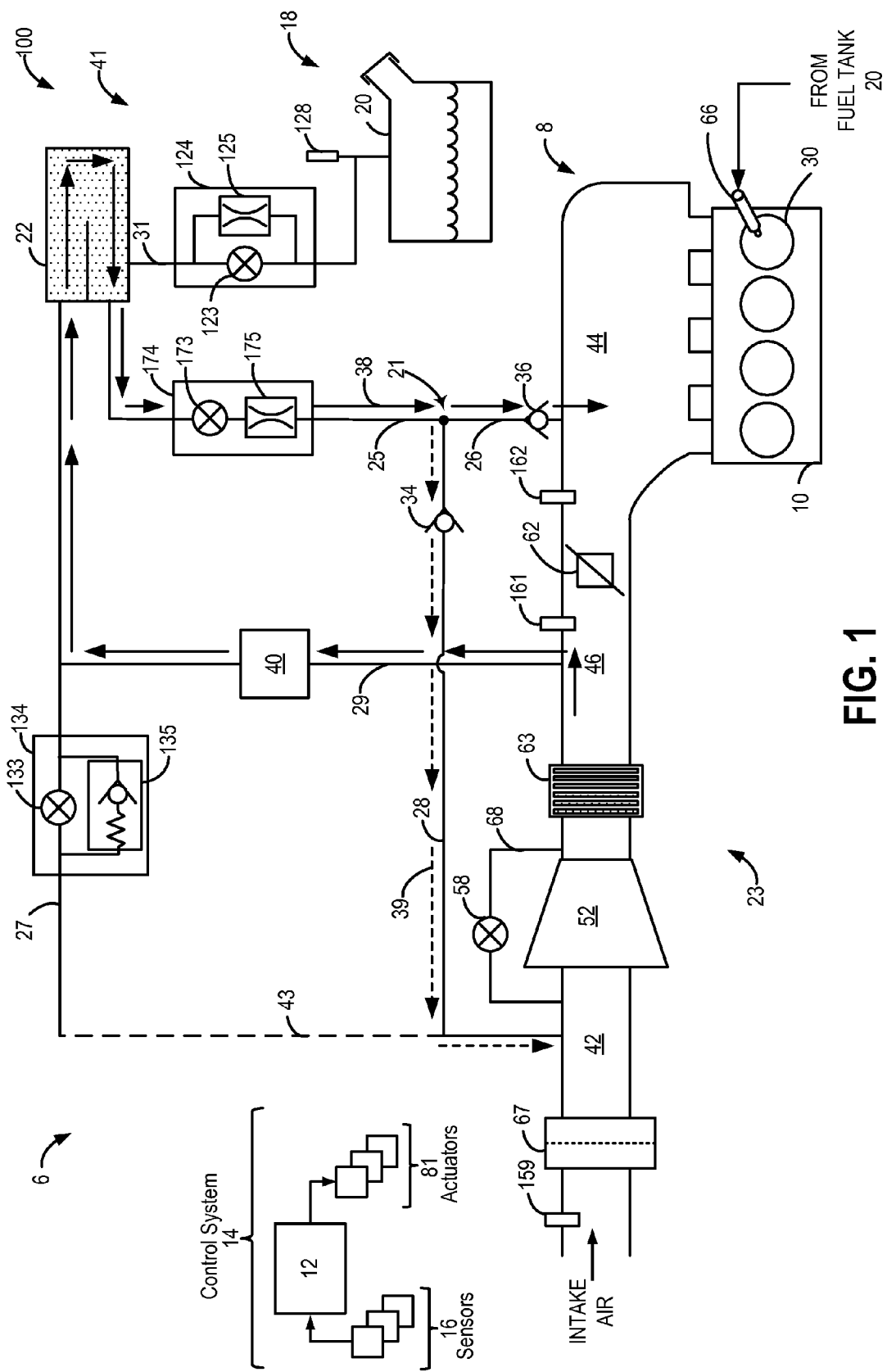
FIGS. 1-5 show schematic depictions of example embodiments of a boosted engine system in a vehicle, and an associated evaporative emissions control system.

FIG. 1 shows a schematic depiction of an embodiment 100 of a vehicle system 6. The vehicle system 6 includes an engine system 8 coupled to a fuel vapor recovery system 41 and a fuel system 18. The engine system 8 may include an engine 10 having a plurality of cylinders 30. Engine 10 includes an engine intake 23 and an engine exhaust (not shown). Engine intake 23 includes a throttle 62 fluidly coupling an engine intake manifold 44 to a first intake passage 46. The engine exhaust may include an exhaust manifold leading to an exhaust passage that routes exhaust gas to the atmosphere. The engine exhaust may include one or more emission control devices, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves, as further elaborated below and in the example embodiments of FIGS. 2-5.

Engine system 8 may further include a compressor 52 arranged between first intake passage 46 and a second intake passage 42 for providing a boosted intake air charge to intake manifold 44. Using the boosted intake air, a boosted engine operation may be performed.

Compressor 52 may be at least partially powered by an exhaust turbine (not shown). Compressor 52 may be coupled to the exhaust turbine via a shaft. The exhaust turbine may be arranged between the exhaust manifold and the exhaust passage and may be driven by exhaust gases. A wastegate (not shown) may be coupled across the exhaust turbine. Specifically, the wastegate may be included in a bypass passage (not shown) coupled between an inlet and outlet of exhaust turbine. By adjusting a position of the wastegate, an amount of boost provided by the exhaust turbine may be controlled. In one example, when a larger amount of boost is requested, a larger amount of exhaust gases may be directed through the turbine. Alternatively, for example when a smaller amount of boost is requested, some or all of the exhaust gas may bypass the turbine via the turbine bypass passage, as controlled by the wastegate. The position of wastegate may be controlled by a wastegate actuator (not shown) as directed by a controller 12.

In some examples, compressor 52 may be any suitable intake-air compressor, such as a motor-driven supercharger compressor.

Compressor 52 draws fresh air from air cleaner 67 and flows compressed air through an intercooler 63. The intercooler may also be termed as a charge air cooler (CAC). As such, each of compressor 52 and intercooler 63 are positioned upstream of intake throttle 62. Intercooler 63 cools the compressed air, which then flows via intake throttle 62 to intake manifold 44, depending on the position of a throttle plate of intake throttle 62. A compressor inlet pressure sensor may be coupled immediately upstream of the compressor for providing a signal regarding compressor inlet pressure (CIP) to controller 12.

A compressor recirculation passage 68 may be provided for compressor surge control. Specifically, to reduce compressor surge, boost pressure may be dumped from the first intake passage 46 upstream of intercooler 63 and intake throttle 62, to second intake passage 42 (in particular, downstream of air filter 67 and upstream compressor 52). Flow through compressor recirculation passage 68 may be regulated by adjusting a position of compressor recirculation valve 58 (CRV 58) positioned therein. CRV 58 may also be termed a compressor surge valve, a compressor bypass valve (CBV), a diverter valve, etc. In the depicted example, CRV 58 may be a continuously variable valve whose position can be adjusted to a fully open position, a fully closed position, or any position there-between.

By flowing boosted air from upstream of an intake throttle inlet to upstream of the compressor inlets, compressor operation in a surge region may be avoided. Further, by coordinating the operation of the CRV with those of a wastegate, boost response and surge margins can be improved.

In an alternate configuration, the compressor recirculation passage may be located such that compressed air flows from downstream of air cooler 63 to a location upstream of compressors 52.

During nominal engine operating conditions, CRV 58 may be kept nominally closed, or nearly closed. Then, in response to surge, an opening of CRV 58 may be increased.

In some embodiments, one or more sensors may be coupled in compressor recirculation passage 58 to determine the mass of recirculated flow delivered from the throttle inlet to the intake passage. The various sensors may include, for example, pressure, temperature, and/or flow sensors.

Engine system 8 further includes fuel system 18 comprising a fuel tank 20, a fuel pump (not shown) and other components which will be described further below. Fuel tank 20 stores a volatile liquid fuel that may be delivered via a fuel injector 66 to combustion chambers 30 in engine 10. To avoid emission of fuel vapors from fuel tank 20 into the atmosphere, fuel tank 20 is vented to the atmosphere through a fuel vapor canister 22. Fuel vapor canister 22 may also be referred to as an adsorbent canister, a fuel system canister, a charcoal canister, or simply, a canister, in the rest of this description. Fuel vapor canister 22 may be part of an evaporative emissions system 41. Fuel vapor canister 22 may have a significant capacity for storing hydrocarbon-, alcohol-, and/or ester-based fuels in an adsorbed state. The adsorbent canister may be filled with activated carbon granules and/or another high surface-area material, for example, to adsorb fuel vapors received from the fuel tank. Nevertheless, prolonged adsorption of fuel vapor will eventually reduce the capacity of the adsorbent canister for further storage and may result in bleed emissions. Therefore, the adsorbent canister may be periodically purged of adsorbed fuel vapors, as further described hereinafter. While a single fuel vapor canister 22 is shown in FIG. 1, it will be appreciated that any number of canisters may be coupled in engine system 8.

Fuel tank 20 is coupled to canister 22 by a conduit 31, which includes a vapor blocking valve (VBV) 124. VBV 124 comprises a solenoid valve 123 and a flow restriction 125. In the depicted example, flow restriction 125 may be an orifice. It will be noted that the solenoid valve 123 and orifice 125 may be positioned within a single, common housing of VBV 124. It will also be noted that orifice 125 is positioned proximate to solenoid valve 123 within VBV 124. It may be further noted that the VBV may include valves other than solenoid valves and flow restrictions other than orifices without departing from the scope of the present disclosure. As such, orifice 125 and solenoid valve 123 may be arranged in parallel.

In some embodiments, operation of solenoid valve 123 within VBV 124 may be regulated by adjusting a driving signal (or pulse width) of the dedicated solenoid. Solenoid valve 123 may be a normally open valve. By maintaining solenoid valve 123 at open, the vehicle can be refueled when the engine is shut down. Specifically, refueling vapors from fuel tank 20 may flow through solenoid valve 123 into fuel vapor canister 22, where the vapors are adsorbed. Further, remnant air may exit into the atmosphere through a canister vent valve (CVV) 134 along a vent line 27. It will be noted that solenoid valve 123 within VBV 124 may be closed during vehicle operation to insure that during purging operation the canister is purged without drawing additional vapors from the fuel tank into the purging operation. Further still, solenoid valve 123 within VBV 124 may be closed to impede flow of vapors generated during fuel slosh in the fuel tank 20 into purge conduit 25. During engine operating conditions when solenoid valve 123 is closed, orifice 125 may prevent fuel tank from pressurizing above a threshold pressure (e.g., above a mechanical pressure limit of the fuel tank above which the fuel tank and other fuel system components may incur mechanical damage). During refueling operations, and selected purging conditions, solenoid valve 123 within the VBV 124 may be opened to direct fuel vapors from the fuel tank 20 to canister 22. By opening solenoid valve 123 during refueling conditions, the refueling vapors may be released into the canister and the fuel tank pressure may be maintained below pressure limits.

One or more pressure sensors 128 may be coupled to fuel tank 20 for estimating a fuel tank pressure or vacuum level in fuel tank 20. While the depicted example shows a pressure sensor 128 coupled between the fuel tank and VBV 124, in alternate embodiments, pressure sensor 128 may be coupled to fuel tank 20.

Fuel vapor canister 22 is fluidically coupled to first intake passage 46 at a location downstream of compressor 52 and CAC 63, and upstream of throttle 62 via conduit 29, which is herein referred to as inlet line 29. In an alternate embodiment, inlet line 29 may be coupled to first intake passage 46 at a location downstream of compressor, and upstream of CAC 63 and throttle 62. Inlet line 29 may be utilized for flowing either un-compressed or compressed intake air into the canister during purging operations. For example, during purging under non-boosted conditions, intake manifold vacuum is utilized to draw un-compressed intake air from first intake passage 46 into canister 22 via inlet line 29. During purging under boosted conditions, pressure of compressed air is utilized to flow compressed intake air from first intake passage 46 into canister 22 via inlet line 29.

Inlet line 29 may include a pressure regulator 40 for metering uncompressed or compressed air flow to the canister during purging operations. For example, during boosted conditions, pressure regulator 40 may decrease a pressure of boosted intake air delivered to the canister so as to reduce damage to the canister that may be caused by excess boost pressure. Further, a degree of regulation or restriction of pressure regulator 40 may be based on a pressure difference across the canister (indicated by one or more pressure sensors (not shown) located at or near each of an inlet port and an outlet port of canister 22), and a compressor outlet pressure. In some examples, intake air flow into the compressor may be regulated by a pulse-width modulated valve that is continuously adjusted based on a pressure difference across the canister. Further, pressure regulator may also regulate flow of un-compressed intake air into the canister during non-boosted conditions.

In these and other embodiments, metering the intake air may further comprise restricting the flow of the compressed air via one or more portioning valves, such as, fixed or adjustable, electronically controlled valves.

In this way, by utilizing intake air to purge a fuel vapor canister during both boosted and non-boosted conditions, an amount of external (ambient) air that may be introduced (for example, when purging with ambient air) may be reduced. Thus, a desired engine air-fuel ratio may be maintained. Further, by regulating a pressure and/or flow of intake air delivered to the canister, mechanical damage to the canister may be reduced.

Fuel vapor canister 22 is additionally coupled to atmosphere via vent line 27. Alternatively, canister 22 may be coupled to a clean air side of second intake passage 42 upstream of compressor 52 via conduit 43. Further, a canister vent valve 134 (CVV 134) is positioned within vent line 27. CVV 134 comprises a solenoid valve 133 and a pressure relief valve 135. Solenoid valve 133 and pressure relief valve 135 may be positioned within a single, common housing of CVV 134. Further, solenoid valve 133 and pressure relief valve 135 may be positioned in a parallel configuration within the housing of CVV 134. The operation of solenoid valve 133 within CVV 134 may be regulated by adjusting a driving signal (or pulse width) of the dedicated solenoid. Solenoid valve 133 within CVV 134 may be a normally open valve.

CVV 134 may regulate the flow of fresh air into the canister and/or allow air to exit the canister. For example, during selected purging operations, fresh air is drawn through CVV 134 into fuel vapor canister 22 to enable desorption of stored fuel vapors. However, when intake air (for example, intake air from first intake passage downstream of compressor) is utilized for purging, solenoid valve 133 within CVV 134 may be closed. When solenoid valve 133 is closed, pressure relief valve 135 may prevent an inlet port of the canister from pressurizing above a threshold pressure. For example, the pressure relief valve may be configured to open at a threshold pressure (e.g., 3.5 kilopascal (kPa), 5 kPa, or 10 kPa). Thus, when purging with intake air, if a pressure of the intake air delivered to the canister reaches the threshold pressure, relief valve 135 is opened so that the canister inlet is maintained at a pressure below the threshold pressure. In this way, the pressure relief feature of CVV 134 provided by pressure relief valve 135 may be utilized to prevent canister from reaching pressures above which the canister may incur structural damage.

In another example, such as during a refueling operation, a mixture of air and fuel vapors may flow from fuel tank 20 into fuel vapor canister 22 via VBV 124. The fuel vapors may be adsorbed within fuel vapor canister 22 while air, stripped of fuel vapors, exits the canister via CVV 134.

In yet another example, during an evaporative emissions leak detection test, solenoid valve 133 within CVV 134 may be closed in order to seal the evaporative emissions control system from the atmosphere.

The depicted example of engine system 8 shows fuel vapor canister 22 further coupled to a canister purge valve 174 (CPV 174). Specifically, fuel vapor canister 22 is fluidically coupled to CPV 174 via purge conduit 25. Purge conduit 25 may split into purge conduit 26 and purge conduit 28 at node 21. In other words, one end of purge conduit 26 and one end of purge conduit 28 merge at node 21. A second end of purge conduit 26 may be coupled to intake manifold 44. Thus, purge conduit 26 fluidically couples CPV 174 with intake manifold 44. A second end of purge conduit 28 may be coupled to second intake passage 42 at a location upstream of compressor. Thus, purge conduit 28 fluidically couples CPV 174 with intake passage 42. Further, purge conduit 26 includes a check valve 36, and purge conduit 28 includes a check valve 34 to obstruct reverse flow of gases towards fuel vapor canister 22. Further still, check valves 34 and 36 allows the fuel vapor canister (and associated plumbing elements) to be checked for leaks at a vacuum.

Thus, depending on a mode of purging operation (non-boosted or boosted), fuel vapors stored in canister 22 may be released into intake manifold 44 via CPV 174 and purge conduit 26, or the fuel vapors from canister 22 may be released into second intake passage 42 upstream of compressor via CPV 174 and purge conduit 28. The quantity and rate of vapors released by the CPV may be determined by the duty cycle of an associated canister purge valve solenoid (not depicted). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the CPV to be closed, the controller may seal the fuel vapor recovery system from the engine intake CPV 174, which is depicted schematically in FIG. 1, comprises a solenoid valve 173 and a flow restriction 175. In the depicted example, flow restriction 175 may be a sonic choke 175. It will be noted that the solenoid valve 173 and the sonic choke 175 may be positioned within a single, common housing of CPV 174. In other words, solenoid valve 173 and sonic choke 175 may be located within the same housing of the CPV 174. It will also be noted that sonic choke 175 is positioned proximate to solenoid valve 173 within CPV 174. It may be further noted that the CPV may include valves other than solenoid valves and flow restrictions other than sonic chokes without departing from the scope of the present disclosure. Sonic choke 175 may also be termed sonic nozzle 175. As such, sonic choke 175 and solenoid valve 173 may be arranged in series.

As depicted in FIG. 1, flow restriction 175 (or sonic choke 175) is positioned downstream of solenoid valve 173 such that an inlet of sonic choke 175 fluidically communicates with an outlet of solenoid valve 173. In alternate embodiments, sonic choke 175 may be positioned upstream of solenoid valve 173 without departing from the scope of this disclosure. An outlet of sonic choke 175 is fluidically coupled to intake manifold 44 via purge conduit 25 and first purge conduit 26. As shown, purge conduit 25 and purge conduit 26 fluidically couples the outlet of sonic choke 175 to intake manifold 44 downstream of intake throttle 62. The outlet of sonic choke 175 may also be coupled to second intake passage 42 via purge conduit 25 and purge conduit 28. As shown, purge conduit 25 and purge conduit 28 fluidically couples the outlet of sonic choke 175 to second intake passage 42 upstream of compressor 52.

Opening or closing of CPV 174 is performed via actuation of solenoid valve 173 by controller 12. Specifically, a pulse width modulated (PWM) signal may be communicated to the solenoid valve 173 in CPV 174 during a canister purging operation. In one example, the PWM signal may be at a frequency of 10 Hz. In another example, the solenoid valve 173 may receive a PWM signal at a multiple or sub-multiple of engine firing frequency which may provide the solenoid valve with a similar actuation characteristic to a fuel injector.

CPV 174 may be a two-port CPV comprising a first, inlet port in fluidic communication with fuel vapor canister 22 and a second, outlet port fluidically coupling the outlet of sonic choke 175 to intake manifold 44 via first purge conduit 26. Further, the second outlet port may fluidically couple the outlet of sonic choke 175 to second intake passage 42 via purge conduit 28.

Fuel system 18 may be operated by controller 12 in a plurality of modes by selective adjustment of the various valves and solenoids. For example, the fuel system may be operated in a fuel vapor storage mode wherein the controller 12 may close CPV 174, open CVV 134 and VBV 124 to direct refueling and diurnal vapors into canister 122 while preventing fuel vapors from being directed into the intake manifold. In this mode, air stripped of fuel vapors may be streamed from canister 22 to the atmosphere CVV 134 and vent line 27. In one example, vent line 27 may be coupled to second intake passage 42 via conduit 43 (indicated as dashed line 43) instead of leading to the atmosphere. When vent line 27 is coupled to intake passage 42, during the fuel vapor storage mode, air stripped of fuel vapors may be routed from canister 22 to second intake passage 42 instead of being routed to atmosphere.

As another example, the fuel system may be operated in a refueling mode (e.g., when fuel tank refueling is requested by a vehicle operator), wherein the controller 12 may open each of CVV 134 and VBV 124 while maintaining canister purge valve 174 closed, to depressurize the fuel tank before enabling fuel to be added therein. As such, VBV 124 may be kept open during the refueling operation to allow refueling vapors to be stored in the canister. After refueling is completed, the VBV may be closed.

As yet another example, the fuel system may be operated in a canister purging mode (e.g., when canister is saturated, an emission control device has attained light-off temperature, and with the engine running), wherein the controller 12 may open CPV 174, close each of CVV 134 and VBV 124. By closing the VBV, the canister can be purged more efficiently.

During the canister purging mode, when the engine is operating under boosted conditions, pressure difference across the compressor is utilized to draw compressed intake air from first intake passage downstream 46 of compressor 52 into canister 22. Further, flow of compressed air into the canister is regulated by pressure regulator 40. The compressed intake air facilitates desorption of the stored fuel vapors in canister 22. The desorbed fuel vapors along with a portion of intake air (herein referred to as purge gases) are then delivered to intake passage 42 through purge conduit 25 and purge conduit 28 via CPV 174. That is, during boosted conditions, purge gases including desorbed fuel vapors and air from the outlet port of canister 22 flow to purge conduit 25, and subsequently pass through CPV 174, and purge conduit 28 en route to intake passage 42 upstream of compressor 52. Purge flow during boosted conditions is indicated by solid arrow lines 38 and broken arrow lines 39. In this way, a portion of compressed air may be utilized to purge fuel vapors stored in the canister, and the purge gases may be directed to the intake passage upstream of the compressor.

Further, wastegate may be adjusted so as to provide desired boost. Additionally or alternatively, CRV 58 may be adjusted to reduce compressor surge. For example, during purging with compressed air, when a boost pressure is less than desired, an opening amount of wastegate may be increased to increase exhaust flow into turbine, thereby increasing compressor outlet pressure to meet the boost demand. However, if the increase in compressor outlet pressure increases a compressor pressure ratio that causes compressor 52 to operate in a surge region, an opening amount of CRV 58 may be adjusted to increase flow through the compressor and reduce compressor pressure ratio in order to reduce compressor surge.

During the canister purging mode, when the engine is operating under non-boosted conditions, intake manifold vacuum is utilized to draw intake air from first intake passage downstream 46 of compressor 52 into canister 22. The intake air facilitates desorption of the stored fuel vapors in canister 22. The purge gases are then flown into intake manifold 44 through purge conduit 25 and purge conduit 26 via CPV 174. That is, during non-boosted conditions, purge gases including fuel vapors and air from the outlet port of canister 22 flow to purge conduit 25, and subsequently pass through CPV 174, and purge conduit 26 en route to intake manifold 44. Purge flow during non-boosted conditions is indicated by solid arrow lines 38.

Thus, during purging when the engine is on, intake air from first intake passage 46 downstream of compressor is delivered to canister 22 via pressure regulator 40 within inlet line 29. The purge gases including desorbed fuel vapors and air that exit canister 22 flow through CPV 174 via purge conduit 25 until node 21. That is, during engine on purging conditions, purge flow follows a common path from first intake passage 46 through canister 22 and CPV 174 until node 21. From node 21, purge gases flow towards a location that has a lower pressure relative to first intake passage. For example, when the engine is operating with boost, purge gases flow to second intake passage 42 via purge conduit 28; and when the engine is operating without boost, intake manifold vacuum draws the purge gases into intake manifold 44 via purge conduit 26.

In this way, during both boosted and non-boosted conditions, a portion of intake air may be utilized to purge fuel vapors stored in the canister, and the purge gases may be directed to the intake manifold. By utilizing air from the intake passage instead of ambient air for purging a desired air-fuel ratio may be maintained. Consequently, engine efficiency and fuel economy may be improved.

During selected canister purging conditions, when the engine is operating under non-boosted conditions (e.g., when a difference between a throttle inlet pressure (TIP) and a manifold absolute pressure (MAP) is less than a difference between BP and the MAP by a threshold amount, or when a difference between TIP and MAP is less than a threshold difference), it may be desirable to purge with ambient air instead of intake air to improve purge efficiency. During the selected canister purging conditions, CVV 134 is opened, CPV 174 is opened, and VBV 124 is closed to purge the canister with ambient air. As discussed above, the purge gases are then delivered to intake manifold 44 through purge conduit 25 and purge conduit 26 via CPV 174.

The purging may be continued until the stored fuel vapors amount in the canister is below a threshold. In another example, purging may continue until engine conditions cannot tolerate additional fuel vapors and/or air. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel system canister.

Alternatively, in one example, one or more sensors (not shown) may be coupled to purge conduit 25 to estimate fuel vapor concentration in purge flow. In another example, the fuel system canister load may be based on the number and duration of refueling events that have occurred following a previous canister purging event. Based on the canister load, and further based on engine operating conditions, such as engine speed-load conditions, a purge flow rate may be determined. As such, controller 12 may maintain an estimate of fuel vapor concentration in canister 22 during operation.

Controller 12 may be configured as a microcomputer including a microprocessor unit, input/output ports, an electronic storage medium for executable programs and calibration values, random access memory, keep alive memory, and a data bus. Controller 12 may receive various signals from sensors 16 coupled to engine 10 such as BP sensor 159, MAP sensor 162, compressor inlet pressure sensor, compressor outlet pressure sensor, TIP sensor 161, one or more canister pressure sensors, etc. Furthermore, controller 12 receives signals from the various sensors 16 of FIG. 1 and employs the various actuators 81 of FIG. 1 to adjust engine operation based on the received signals and instructions stored on a memory of the controller. These actuators may include, for example, intake throttle 62, intake and exhaust valve systems, solenoid valve 173, solenoid valve 133, and solenoid valve 123.

Controller 12 may also be configured to intermittently perform leak detection routines on evaporative emissions system 41 to confirm that the evaporative emissions system is not degraded. As such, during leak detection, controller may close each of CVV 134, CPV 174, and VBV 124 to seal the evaporative emissions system during leak detection.

Storage medium read-only memory in controller 12 can be programmed with computer readable data representing instructions executable by a processor for performing the routines described below, as well as other variants that are anticipated but not specifically listed. Example routines are described herein with reference to FIGS. 6-9.

In one example, the system of FIG. 1 provides for a vehicle system, comprising: a boosted engine; a fuel tank; a fuel vapor canister; an inlet line coupling a first intake passage downstream of a compressor of the engine and upstream of an intake throttle to an inlet port of the canister; a first purge conduit coupling an outlet port of the canister to a node; a canister purge valve coupled within the first purge conduit; a second purge conduit coupling the node to an intake manifold; a third purge conduit coupling the node to a second intake passage upstream of the compressor; a vent line coupling the outlet port of the canister to ambient air; a canister vent valve coupled within the vent line; and a controller having executable instructions stored in a non-transitory memory for: when canister purge conditions are met, during a boosted condition, drawing compressed air through the canister from the first intake passage via the inlet line, and flowing purge gases to the second intake passage via the first purge conduit and the third purge conduit; and during a non-boosted condition, drawing intake air through the canister from the first intake passage via the inlet line, and flowing purge gases to the intake manifold via the first purge conduit and the second purge conduit. The system further includes wherein the controller includes further instructions for, during a refueling condition, flowing fuel vapors from a fuel tank into the canister, and flowing vent gases stripped of fuel vapors from the canister to the second intake passage via vent line and a conduit coupling the vent line with the second intake passage. The system further includes wherein the controller includes further instructions for regulating flow of air into the canister via a pressure regulator located in the conduit when the purging conditions are met, and for adjusting a wastegate coupled across an exhaust turbine driving the compressor based on a desired boost during the purging.

Figure 2:
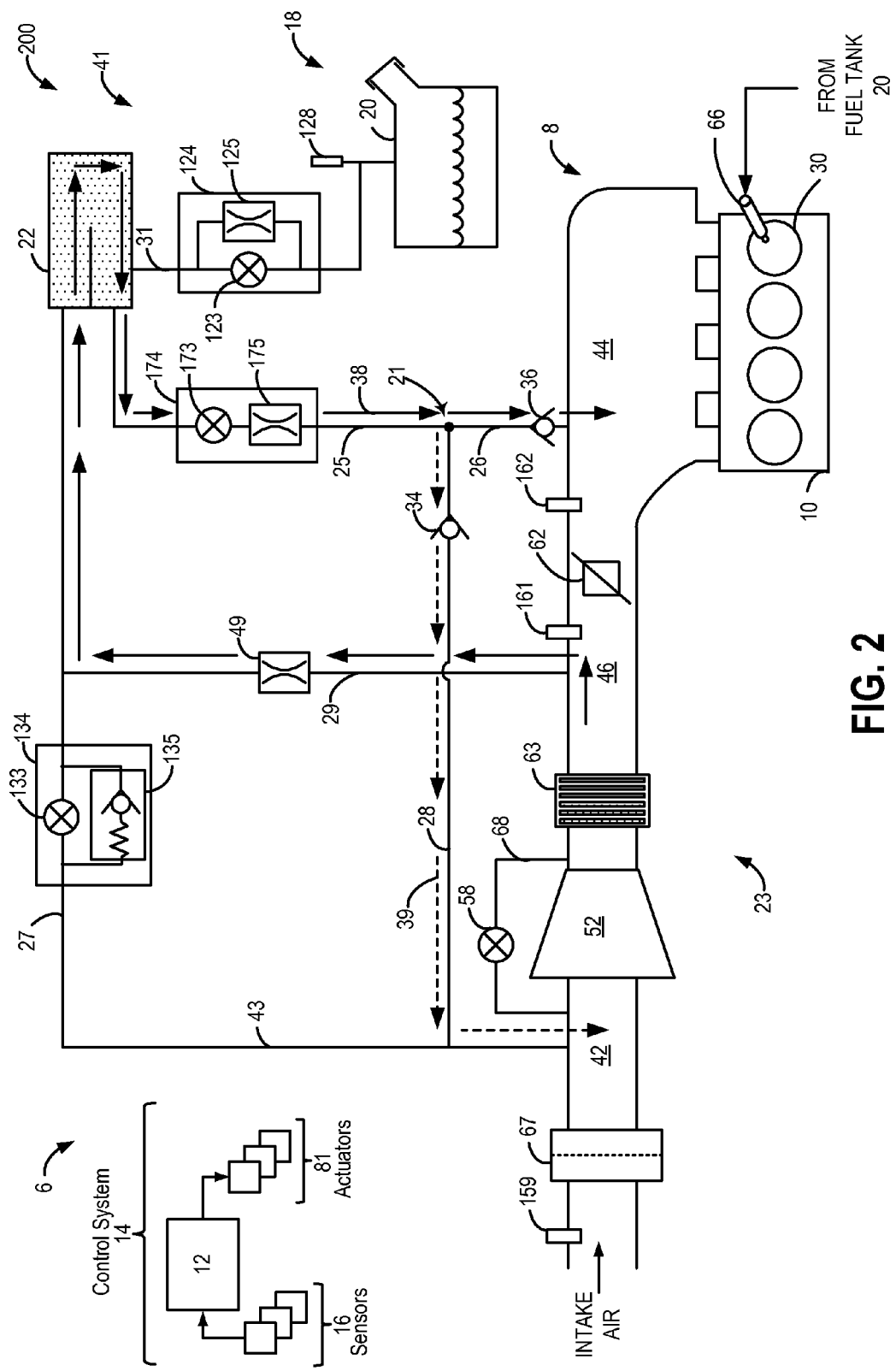

FIG. 2 shows an example embodiment 200 of evaporative emissions control system 41 of FIG. 1. Herein, a flow restriction 49 is coupled within inlet line 29 to regulate flow of intake air to the canister during purging. In one example, flow restriction 49 may be a sonic choke. When sonic choke 49 is utilized in inlet line 29, pressure at an inlet port of the canister at which inlet line 29 is coupled to canister 22 may be regulated by pressure relief valve 135 within CVV 134. In other words, pressure relief valve 135 may be utilized to limit the pressure seen by the canister to pressures below a threshold pressure. For example, pressure relief valve may be configured to open at a threshold pressure (e.g., 3.5 KPa, 5 Kpa, or 10 Kpa). Therefore, when purging with intake air, a pressure at the canister inlet port downstream of the flow restriction may not exceed the threshold pressure. As a result, regulated intake air is delivered to the canister during purging conditions.

Further, in this example embodiment, air exiting vent line 27 may not be routed to the atmosphere; instead air from canister 22 may be routed to clean air side of air filter 67 within second intake passage 42 upstream of compressor 52 via vent line 27 and conduit 43. By coupling vent line 27 to second intake passage 42, evaporative emissions may be reduced.

As discussed above with respect to FIG. 1, fuel system 18 may be operated by controller 12 in a plurality of modes by selective adjustment of the various valves and solenoids. In one example, the fuel system may be operated in a fuel vapor storage mode wherein the controller 12 may close CPV 174, open CVV 134 and VBV 124 to direct refueling and diurnal vapors into canister 22 while preventing fuel vapors from being directed into the intake manifold. In this mode, air stripped of fuel vapors may be streamed from canister 22 to second intake passage 42 via conduit 43 instead of leading to the atmosphere.

In another example, the fuel system may be operated in a refueling mode, wherein the controller 12 may open each of CVV 134 and VBV 124 while maintaining canister purge valve 174 closed, to depressurize the fuel tank before enabling fuel to be added therein. As such, VBV 124 may be kept open during the refueling operation to allow refueling vapors to be stored in the canister. After refueling is completed, the VBV may be closed.

In yet another example, the fuel system may be operated in a canister purging mode (e.g., when canister is saturated, an emission control device has attained light-off temperature, and with the engine running), wherein the controller 12 may open CPV 174, close each of CVV 134 and VBV 124. By closing the VBV, the canister can be purged more efficiently.

During the canister purging mode, when the engine is operating under boosted conditions, pressure difference across the compressor is utilized to draw compressed intake air from first intake passage 46 downstream of compressor 52 into canister 22. Further, flow of compressed air into canister 22 is regulated by sonic choke 49 and pressure relief valve 135 within CVV 134 is utilized to maintain a pressure of intake air delivered to canister 22 at below a threshold pressure. The purge gases flow from the outlet port of canister 22 to purge conduit 25, and subsequently pass through CPV 174, and purge conduit 28 en route to intake passage 42 upstream of compressor 52. Purge flow during boosted conditions is indicated by solid arrows 38 and broken arrows 39. Further, during purging under boosted conditions, wastegate may be adjusted so as to provide desired boost, and/or CRV 58 may be adjusted to reduce compressor surge.

During the canister purging mode, when the engine is operating under non-boosted conditions, intake manifold vacuum is utilized to draw intake air from first intake passage downstream 46 of compressor 52 into canister 22. The purge gases from the outlet port of canister 22 flow to purge conduit 25, and subsequently pass through CPV 174, and purge conduit 26 en route to intake manifold. Purge flow during non-boosted conditions is indicated by solid arrows 38. Thus, during purging when the engine is on, intake air from first intake passage 46 downstream of compressor is delivered to canister 22 via flow regulator 49 within inlet line 29. The purge gases including desorbed fuel vapors and air that exit canister 22 flow through CPV 174 via purge conduit 25 until node 21. That is, during engine on purging conditions, purge flow follows a common path from first intake passage 46 through canister 22 and CPV 174 until node 21. From node 21, purge gases flow towards a location that has a lower pressure relative to first intake passage. For example, when the engine is operating with boost, purge gases flow to second intake passage 42 via purge conduit 28; and when the engine is operating without boost, intake manifold vacuum draws the purge gases into intake manifold 44 via purge conduit 26.

Further, during evaporative emissions leak detection, controller may close each of CVV 134, CPV 174, and VBV 124 to seal the evaporative emissions system.

Figure 3:
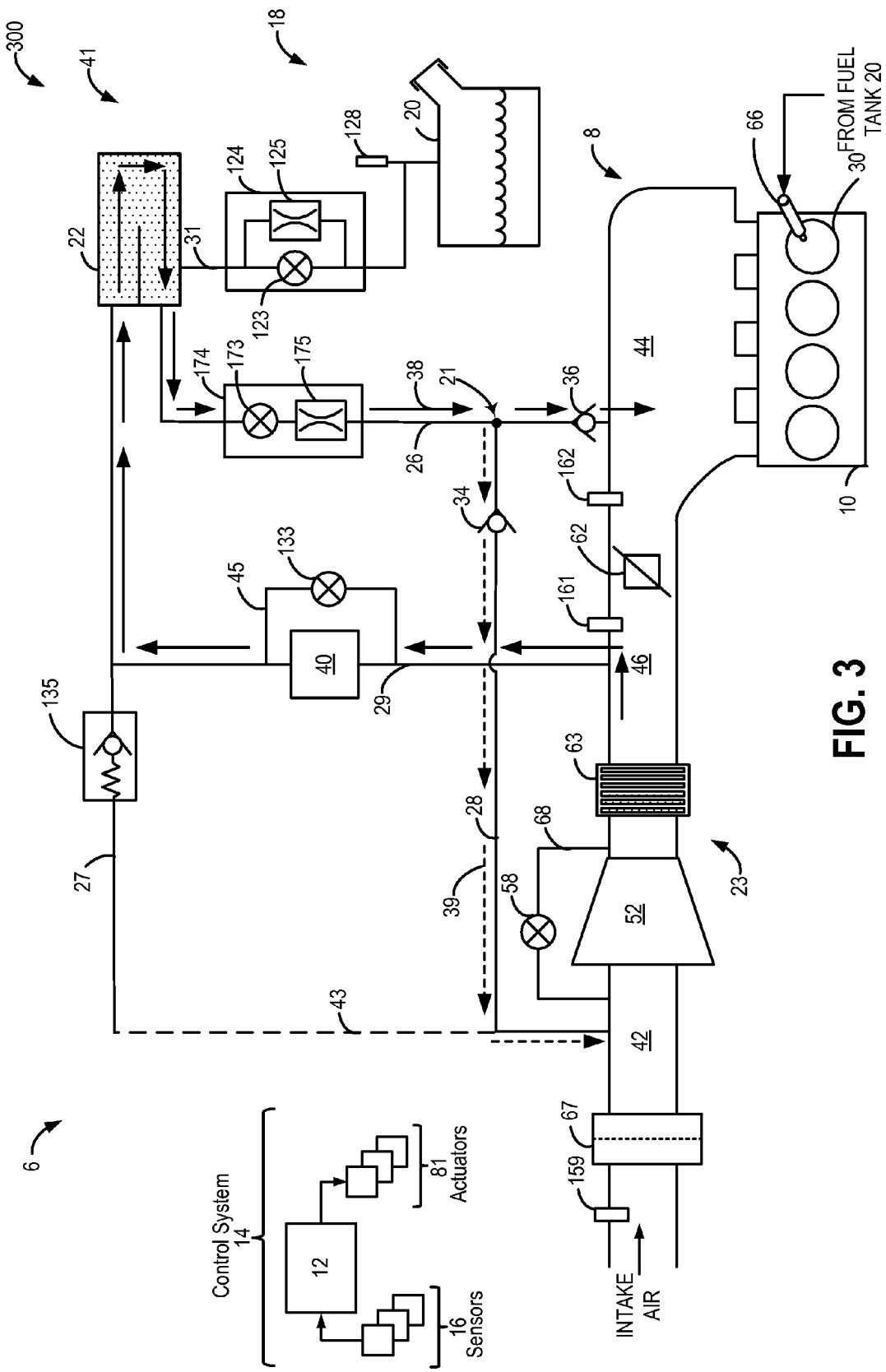

FIG. 3 shows another example embodiment 300 of evaporative emissions control system 41 of FIG. 1. Herein, solenoid valve 133 of CVV 134 is coupled across pressure regulator 40 within passage 45. Further, vent line 27 may couple canister 22 to atmosphere via pressure relief valve 135 coupled within vent line 27. Pressure relief valve 135 is utilized to limit pressure of intake air delivered to canister 22.

In this embodiment, during certain purging conditions, when the pressure of intake air delivered to the canister is less than a lower threshold pressure (e.g., when purging with intake air during non-boosted conditions), solenoid valve 133 may be opened to bypass the pressure regulator.

Further, as discussed above with respect to FIGS. 1 and 2, pressure relief valve 135 may be utilized to maintain the pressure of intake air delivered to the canister at below a higher threshold pressure in order to prevent canister from structural damage due to high pressure of intake air (e.g., when purging with compressed air during boosted conditions).

Further still, as discussed above at FIGS. 1 and 2, when the fuel system is operated in a fuel vapor storage mode, controller 12 may close CPV 174, open solenoid valve 133 and VBV 124 to direct refueling and diurnal vapors into canister 22 while preventing fuel vapors from being directed into the intake manifold. In this mode, air stripped of fuel vapors may be streamed from canister 22 to intake passage 46 via solenoid valve 133.

When the fuel system is operated in a refueling mode, the controller 12 may open each of solenoid valve 133 and VBV 124 while maintaining canister purge valve 174 closed, to depressurize the fuel tank before enabling fuel to be added therein. As such, VBV 124 may be kept open during the refueling operation to allow refueling vapors to be stored in the canister. After refueling is completed, the VBV may be closed.

When the fuel system is operated in a canister purging mode, the controller 12 may open CPV 174, close each of solenoid valve 133 and VBV 124. By closing the VBV, the canister can be purged more efficiently.

During the canister purging mode, when the engine is operating under boosted conditions, pressure difference across the compressor is utilized to draw compressed intake air from first intake passage downstream 46 of compressor 52 into canister 22. Further, flow of compressed air into the canister is regulated by pressure regulator 40, and pressure relief valve 135 is utilized to maintain a pressure of intake air delivered to canister 22 at below a threshold pressure. The purge gases from the outlet port of canister 22 flow to purge conduit 25, and subsequently pass through CPV 174, and purge conduit 28 en route to intake passage 42 upstream of compressor 52. Purge flow during boosted conditions is indicated by solid arrow lines 38 and broken arrow lines 39. Further, during purging under boosted conditions, wastegate may be adjusted so as to provide desired boost, and/or CRV 58 may be adjusted to reduce compressor surge.

During the canister purging mode, when the engine is operating under non-boosted conditions, intake manifold vacuum is utilized to draw intake air from first intake passage downstream 46 of compressor 52 into canister 22. The purge gases from the outlet port of canister 22 flow to purge conduit 25, and subsequently pass through CPV 174, and purge conduit 26 en route to intake manifold. Purge flow during non-boosted conditions is indicated by solid arrows 38. Thus, during engine on purging conditions, purge gases flow through a common path from first intake passage 46 through canister 22 and CPV 174 until node 21 and subsequently, flow into second intake passage 42 (boosted conditions) or into intake manifold 44 (non-boosted conditions).

In this way, a portion of intake air may be utilized to purge fuel vapors stored in the canister. By utilizing air from the intake passage instead of ambient air for purging a desired air-fuel ratio may be maintained. Consequently, engine efficiency and fuel economy may be improved.

Further, as indicated above with respect to FIGS. 1 and 2, during evaporative emissions leak detection, controller may close each of solenoid valve 133, CPV 174, and VBV 124 to seal the evaporative emissions system.

In one embodiment, the system of FIG. 3 may provide for a vehicle system comprising: a boosted engine; a fuel tank; a fuel vapor canister; an inlet line coupling a first intake passage downstream of a compressor of the engine and upstream of an intake throttle to an inlet port of the canister; a pressure regulator coupled within the inlet line; a solenoid valve coupled across the pressure regulator within a by-pass passage; a first purge conduit coupling an outlet port of the canister to a node; a canister purge valve coupled within the first purge conduit; a second purge conduit coupling the node to an intake manifold; a third purge conduit coupling the node to a second intake passage upstream of the compressor; a vent line coupling the outlet port of the canister to ambient air; a pressure regulating valve coupled within the vent line; and a controller having executable instructions stored in a non-transitory memory for: when canister purge conditions are met, during a boosted condition, drawing compressed air through the canister from the first intake passage via the inlet line, and flowing purge gases from the canister to the second intake passage via the first purge conduit and the third purge conduit; during a first non-boosted condition, drawing intake air through the canister from the first intake passage via the inlet line and the pressure regulator, and flowing purge gases from the canister to the intake manifold via the first purge conduit and the second purge conduit; and during a second non-boosted condition, opening the solenoid valve, drawing intake air through the canister from the first intake passage via the inlet line and the by-pass passage by by-passing the pressure regulator, and flowing purge gases from the canister to the intake manifold via the first purge conduit and the second purge conduit.

In one example, the system further includes wherein the controller includes further instructions for during a refueling condition, opening the solenoid valve, opening a vapor blocking valve coupled within a conduit connecting the canister with the fuel tank, storing fuel vapors in the canister and routing air stripped of fuel vapors from the canister to the first intake passage.

Figure 4:
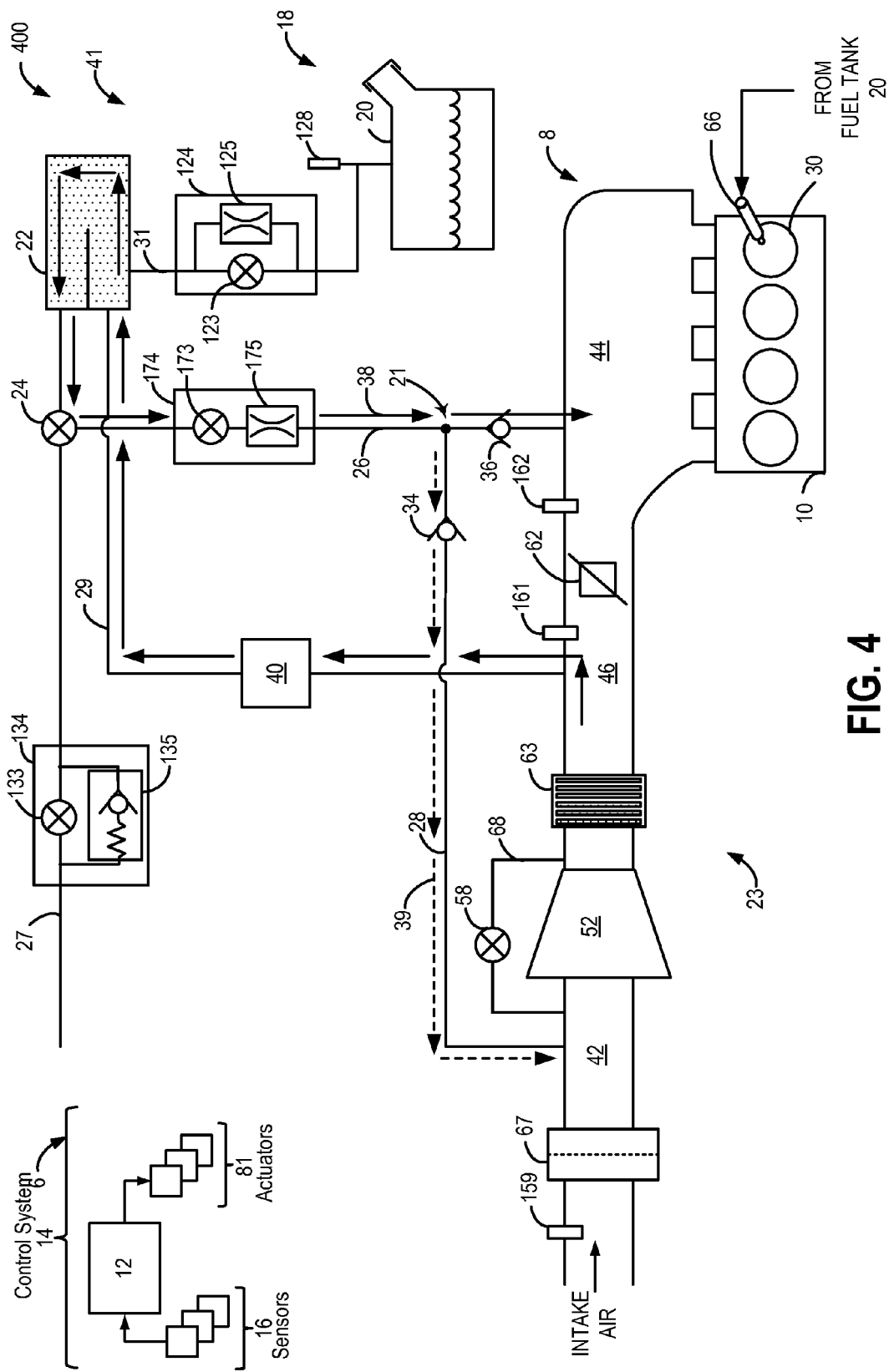

FIG. 4 shows another example embodiment 400 of evaporative emissions control system 41 of FIG. 1. Herein, fuel vapor canister 22 is coupled to each of CPV 174 and CVV 134 via a three-way valve 24. Three-way valve 24 may be adjustable between a first conformation and a second conformation. When operating in the first conformation, three-way valve 24 fluidically couples fuel vapor canister 22 with CPV 174 via purge conduit 25. As such, controller 12 may adjust three-way valve 24 to operate in the first conformation during purging so as to flow purge gases from the canister into purge conduit 25. When operating in the second conformation, three-way valve 24 fluidically couples fuel vapor canister 22 with CVV 134 via vent line 27. Controller 12 may adjust three-way valve 24 to operate in the second conformation during a refueling operation and select purging conditions for venting air to the atmosphere via canister 22. For example, during a refueling operation, a mixture of air and fuel vapors may flow from fuel tank 20 into fuel vapor canister 22 via VBV 124. The fuel vapors may be adsorbed within fuel vapor canister 22 while air, stripped of fuel vapors, exits the canister via three-way valve 24 and CVV 134.

In one example, a second three-way valve that is adjustable between a first conformation and a second conformation may be positioned at a junction of purge conduit 25, purge conduit 26, and purge conduit 28. When operating in the first conformation, the second three-way valve may couple purge conduit 25 to purge conduit 26, and when operating in the second conformation, the second three-way valve may couple purge conduit 25 to purge conduit 28. Controller 12 may adjust a conformation of the second three-way valve based on a mode of engine operation. For example, during purging under boosted conditions, controller 12 may adjust the second three-way valve to operate in the second conformation so that purge gases from canister 22 are directed to upstream of compressor 52. During purging under non-boosted conditions, controller 12 may adjust the second three-way valve to operate in the first conformation so that purge gases from canister may flow via purge conduit 25 and purge conduit 26 into intake manifold 44.

Additionally, fuel vapor canister 22 is fluidically coupled to first intake passage 46 at a location downstream of compressor 52 and CAC 63, and upstream of throttle 62 via inlet line 29. In an alternate embodiment, inlet line 29 may be coupled to first intake passage 46 at a location downstream of compressor, and upstream of CAC 63 and throttle 62. Inlet line 29 may be utilized for flowing either compressed or un-compressed intake air into the canister during purging operations. For example, during purging under boosted conditions, pressure of compressed air is utilized to flow compressed intake air from first intake passage 46 into canister 22 via inlet line 29. During purging under non-boosted conditions, intake manifold vacuum is utilized to draw un-compressed intake air from first intake passage 46 into canister 22 via inlet line 29.

Further, as discussed above with respect to FIGS. 1-3, inlet line 29 may include a pressure regulator 40 for metering uncompressed or compressed air flow to the canister during purging operations. For example, during boosted conditions, pressure regulator 40 may decrease a pressure of boosted intake air delivered to the canister so as to reduce damage to the canister that may be caused by excess boost pressure. Further, a degree of regulation or restriction of pressure regulator 40 may be based on a pressure difference across the canister (indicated by one or more pressure sensors (not shown) located at or near each of an inlet port and an outlet port of canister 22), and a compressor outlet pressure.

In some examples, intake air flow into the compressor may be regulated by a pulse-width modulated valve that is continuously adjusted based on a pressure difference across the canister. Further, pressure regulator may also regulate flow of un-compressed intake air into the canister during non-boosted conditions.

In these and other embodiments, metering the intake air may further comprise restricting the flow of the compressed air via one or more portioning valves, such as, fixed or adjustable, electronically controlled valves.

In this way, by utilizing intake air to purge a fuel vapor canister during both boosted and non-boosted conditions, an amount of external (ambient) air that may be introduced (for example, when purging with ambient air) may be reduced. Thus, a desired engine air-fuel ratio may be maintained. Further, by regulating a pressure and/or flow of intake air delivered to the canister, mechanical damage to the canister may be reduced.

Further, during evaporative emissions leak detection, controller may adjust three-way valve 24 in the second conformation, close each of CVV 134, CPV 174, and VBV 124 to seal the evaporative emissions system.

Figure 5:
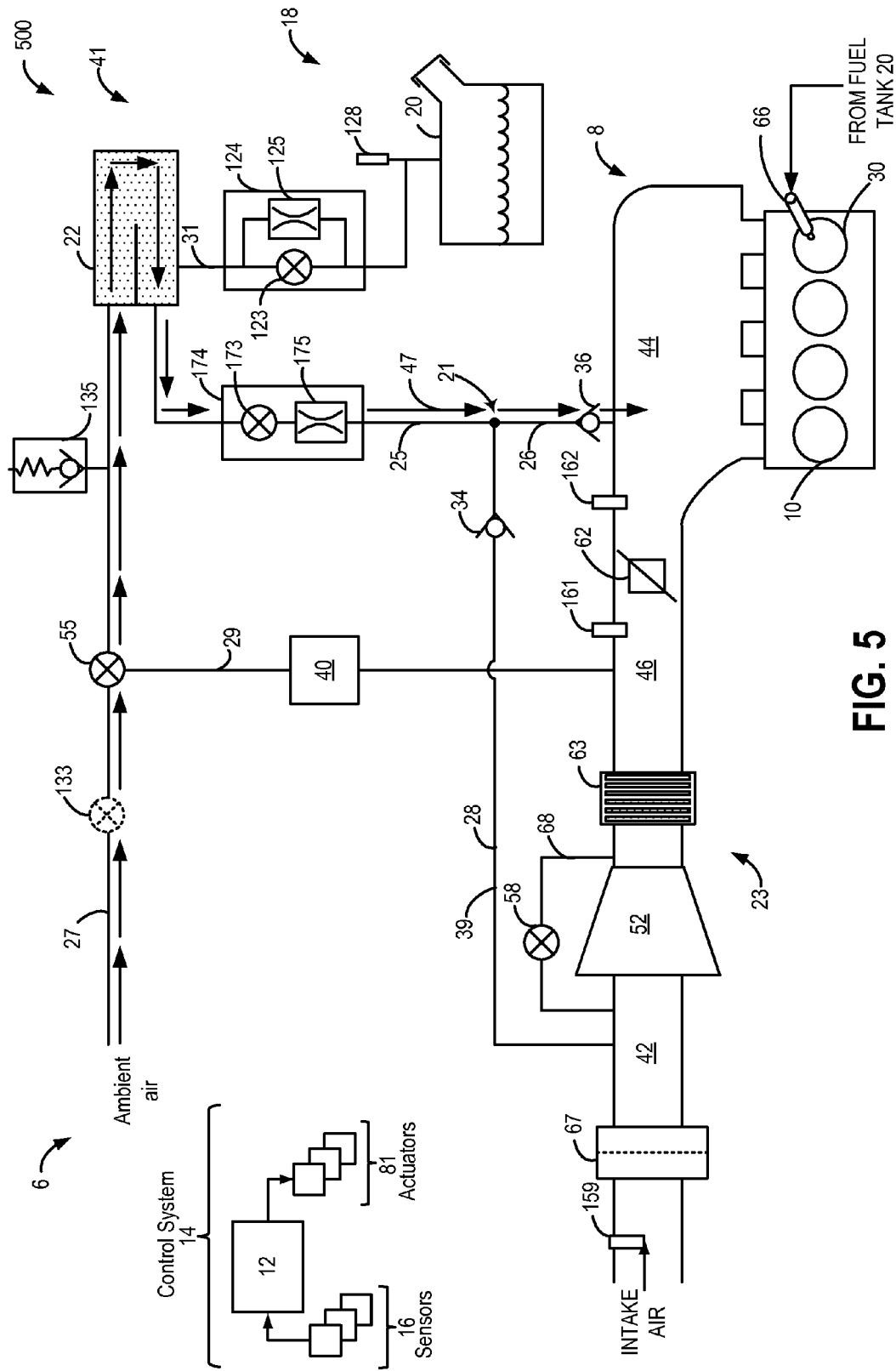

FIG. 5 shows another example embodiment 500 of evaporative emissions control system 41 of FIG. 1. Herein, a three-way valve 55 is utilized to couple fuel vapor canister 22 with first intake passage 46 via inlet line 29 or to couple fuel vapor canister 22 with atmosphere via vent line 27. Three-way valve 55 may be adjusted to operate in a first conformation or a second conformation depending on operating conditions. In the first conformation, three-way valve 55 may fluidically couple the inlet port of canister 22 with first intake passage via inlet line 29. In the second conformation, three-way valve 55 may fluidically couple the inlet port of the canister with ambient air via vent line 27. During certain non-boosted conditions when a difference between a throttle inlet pressure (measured by a pressure sensor (such as, pressure sensor 161) upstream of throttle 62) and a manifold absolute pressure (measured by a MAP sensor (such as pressure sensor 162) downstream of throttle 62) is less than a threshold, ambient air may be utilized to purge fuel vapors from canister 22. For example, three-way valve 55 may be adjusted to operate in the second conformation to couple canister with the atmosphere. Further, CPV 174 may be commanded open. In this embodiment, solenoid valve 133 may be included optionally. When included, solenoid valve 133 may be commanded open. During purging, intake vacuum may be utilized to draw fresh ambient air into the canister via vent line 27 and three-way valve 55. Ambient air may displace adsorbed fuel vapors in the canister. Purge gases including fuel vapors and external air (indicated by solid arrows 47) from the outlet port of canister 22 may flow to purge conduit 25, and subsequently pass through CPV 174, and purge conduit 26 en route to intake manifold 44.

During other engine operating conditions, such as, during boosted conditions, and during non-boosted conditions when a difference between a throttle inlet pressure and a manifold absolute pressure is greater than a threshold, three-way valve 55 may be adjusted to operate in the first conformation coupling the inlet port of canister 22 with inlet line 29. Therefore, three-way valve 55 may allow flow of compressed air during boosted conditions or intake air during non-boosted conditions when a difference between a throttle inlet pressure and a manifold absolute pressure is greater than a threshold from intake passage 46 downstream of compressor into canister 22.

In this way, during a first boosted condition, compressed air may be utilized for purging fuel vapors from the canister into the intake passage upstream of the compressor; during a second non-boosted condition, intake air may be used for purging fuel vapors from the fuel vapor canister into the intake manifold; and during a third non-boosted condition, ambient air may be utilized for purging stored fuel vapors into the intake manifold.

Further, when the fuel system is operated in a fuel vapor storage mode, controller 12 may close CPV 174, open solenoid valve 133 (if present), adjust three-way valve 55 to operate in second conformation, and open VBV 124 to direct refueling and diurnal vapors into canister 22 while preventing fuel vapors from being directed into the intake manifold.

In this mode, air stripped of fuel vapors may be streamed from canister 22 to the atmosphere via vent line 27. Alternatively, air stripped of fuel vapors may be routed to second intake passage 42 via a conduit instead of leading to the atmosphere.

When the fuel system is operated in a refueling mode, the controller 12 may open each of solenoid valve 133 (if present) and VBV 124, and adjust three-way valve 55 to operate in second conformation while maintaining canister purge valve 174 closed, to depressurize the fuel tank before enabling fuel to be added therein. As such, VBV 124 may be kept open during the refueling operation to allow refueling vapors to be stored in the canister. After refueling is completed, the VBV may be closed.

Further, during evaporative emissions leak detection, controller may adjust three-way valve 55 in the first conformation, close each of solenoid valve 133 (if present), CPV 174, and VBV 124 to seal the evaporative emissions system.

Figure 6:
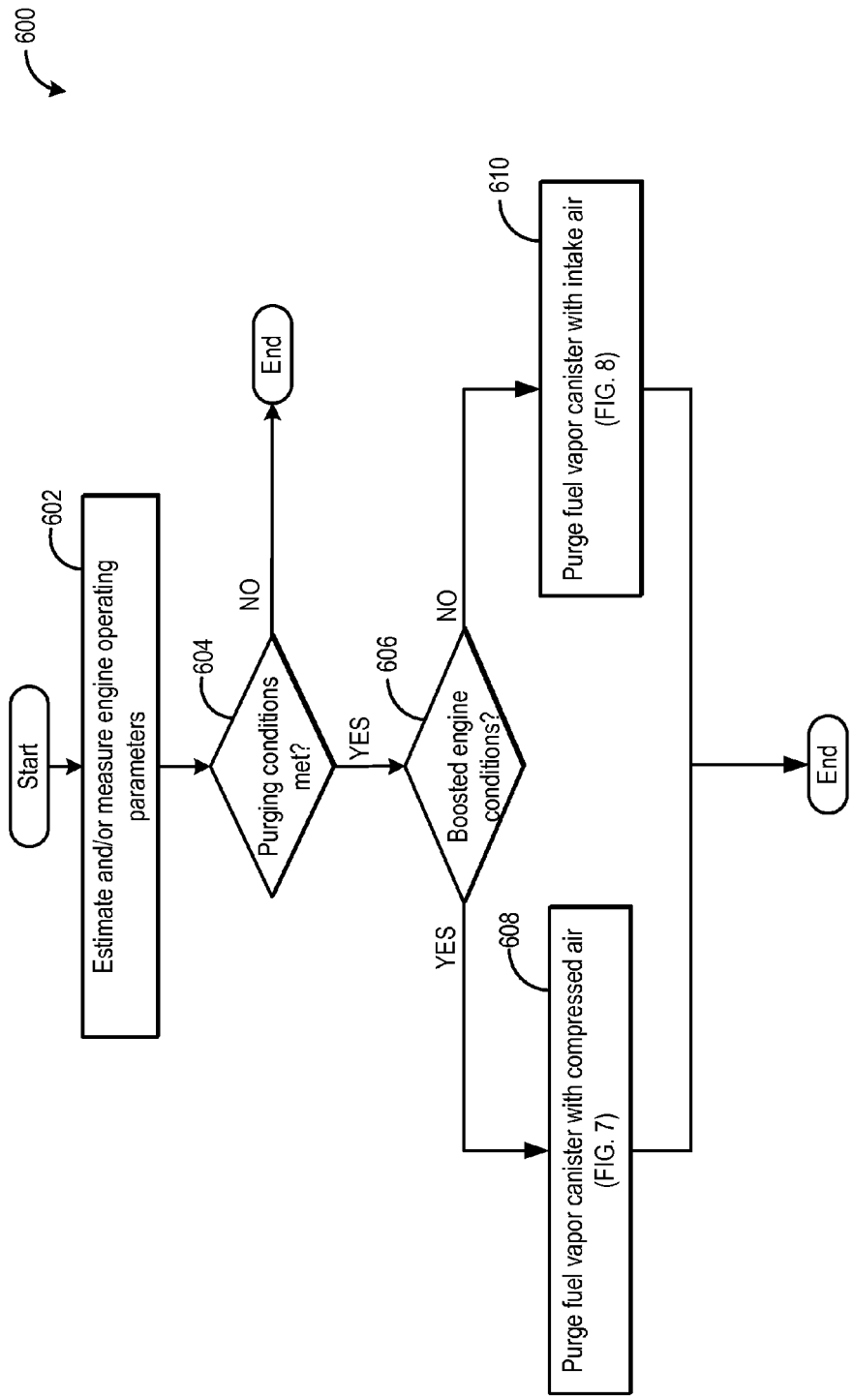
FIG. 6 shows a high level flow chart illustrating an example method for purging a fuel vapor canister during boosted and non-boosted engine operating conditions, in accordance with different embodiments of the present disclosure.

Turning to FIG. 6, a flow chart for a high level method 600 for performing fuel vapor purging during boosted and non-boosted engine operating conditions is shown. Instructions for carrying out method 600 and the rest of the methods included herein may be executed by a controller, such as controller 12 shown in FIGS. 1-5 based on instructions stored on a memory of the controller and in conjunction with signals received from sensors of the engine system, such as the sensors described above with reference to FIGS. 1-5. The controller may employ engine actuators of the engine system to adjust engine operation, according to the methods described below. Method 600 will be described herein with reference to the components and systems depicted in FIGS. 1-5, though it should be understood that the method may be applied to other systems without departing from the scope of this disclosure.

At 602, method 600 includes estimating and/or measuring operating conditions. Operating conditions may include one or more vehicle conditions, one or more engine conditions, one or more evaporative emission control system conditions, and/or one or more fuel system conditions. For example, operating conditions may include, but are not limited to, a fuel vapor purge condition, a vehicle speed, an engine speed, an engine temperature, an engine load, an ambient temperature, a barometric pressure, an exhaust temperature, an exhaust catalyst temperature, a hydrocarbon amount in a canister vent line, MAP, MAF, TIP, compressor pressure ratio, etc. Operating conditions may be measured by one or more sensors 16 coupled to controller 12, or may be estimated or inferred based on available data.

At 604, method 600 includes determining whether canister purging conditions are met. For example, a purging condition may occur while the engine is running. In one example, canister purging conditions may be considered met if a canister hydrocarbon load (as determined or inferred) is higher than a threshold load. In another example, purging conditions may be considered met if a threshold duration or distance of travel has elapsed since a last canister purging operation. In some other examples, purging conditions may be considered met if an intake manifold vacuum is greater than a first threshold vacuum. As another example, purging could occur for an onboard diagnostics (OBD) hardware check, or altitude adjustment for engine operation.

If purging conditions are confirmed, method 600 proceeds to 606 to determine if boosted engine conditions are present. The boosted conditions may include conditions during which a compressor (such as compressor 52 at FIGS. 1-5) is in operation. For example, boosted conditions may be determined to be present when a manifold absolute pressure is greater than a barometric pressure by a threshold amount. If boosted conditions are present, method 600 proceeds to 608. At 608, method 600 includes performing a fuel vapor purging operation under boosted conditions by utilizing compressed air. For example, a portion of the boost pressure is utilized to flow compressed air from a first intake passage (such as first intake passage 46 at FIGS. 1-5) downstream of the compressor and upstream of an intake throttle (such as throttle 62 at FIGS. 1-5). The purge gases, including fuel vapors desorbed from the canister and intake air, are then delivered to a second intake passage (such as second intake passage 42 at FIGS. 1-5) upstream of the compressor. Details of performing a purging operation under boosted conditions by utilizing compressed intake air will be further discussed with respect to FIG. 7.

If boosted conditions are not present, then the routine proceeds to 610. At 610, method 600 includes purging fuel vapor canister with intake air. For example, intake vacuum may be utilized to draw a portion of intake air from the first intake passage into the canister to desorb stored fuel vapors. The purge gases from the canister including desorbed fuel vapors and intake air may then be delivered to the intake manifold. Details of performing a purging operation under non-boosted conditions by utilizing intake air will be further discussed with respect to FIG. 8.

Further, these purge gases may be delivered into combustion chambers for combustion. Based on an amount of fuel vapors received in the manifold from the canister, engine fueling by the fuel injectors may be adjusted. Specifically, a fuel injection timing and/or a fuel injection amount may be modified based on the quantity of purged fuel vapors received from the canister in the intake manifold. For example, fueling via fuel injectors may be decreased as purged fuel vapor concentration increases so as to maintain combustion at stoichiometry.

In this way, during purging, either compressed intake air (boosted conditions) or non-compressed intake air (non-boosted conditions) from the intake passage between the compressor and the throttle is utilized for purging. Consequently, no external (ambient) air is drawn into the intake during the purging operation. As a result, a desired combustion air-fuel ratio may be maintained, thereby improving fuel economy.

In some embodiments, upon confirming non-boosted conditions, method 600 may additionally include determining if a difference between TIP and MAP is greater than a threshold and/or if the difference between TIP and MAP is greater than a difference between BP and MAP by a threshold amount and/or if an intake manifold vacuum level is greater than a second threshold vacuum, the second threshold being greater than the first threshold discussed at 604. If yes, intake air is utilized for fuel vapor purging, otherwise, ambient air is utilized for fuel vapor purging. In this way, when the difference between TIP and MAP is less than threshold, or when sufficient intake vacuum is not available to draw intake air from the first intake passage downstream of the compressor into the canister, ambient air may be utilized for purging. Details of performing a purging operation under non-boosted conditions by utilizing ambient air will be further discussed with respect to FIG. 9.

Figure 7:
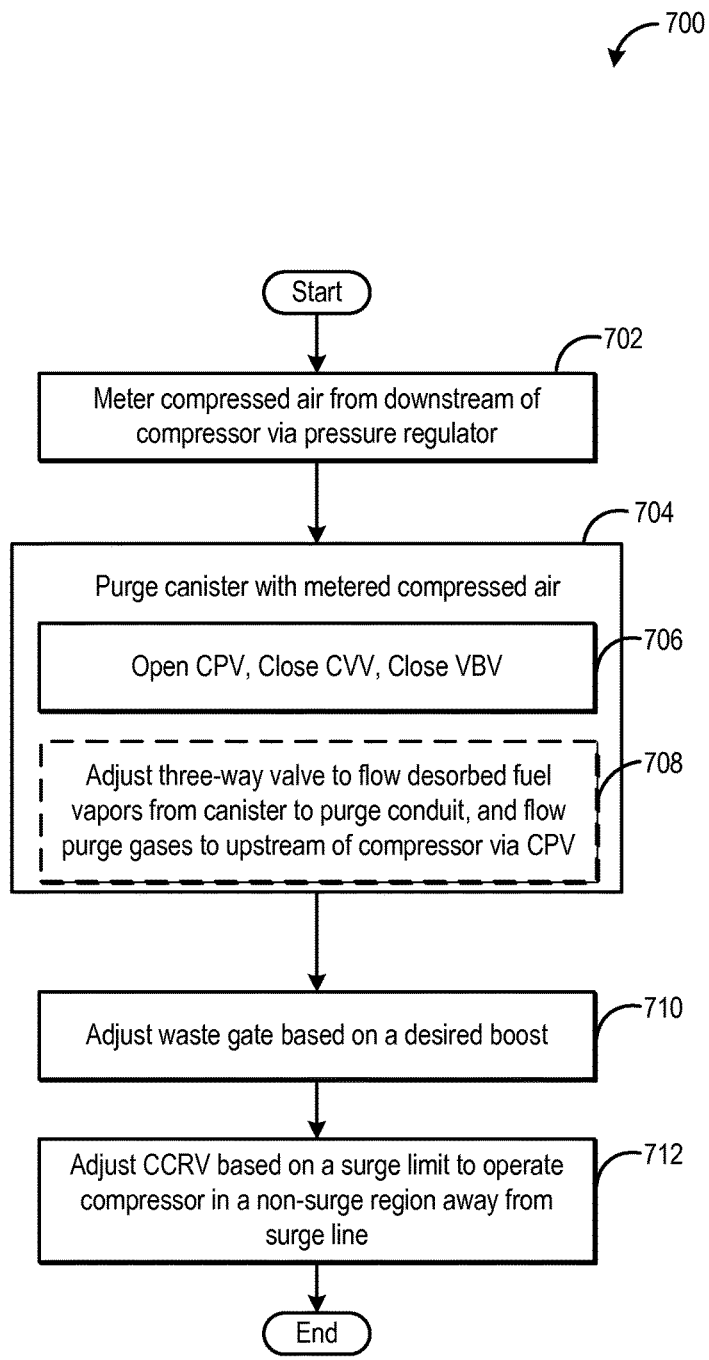
FIG. 7 shows a high level flow chart illustrating an example method for purging a fuel vapor canister by utilizing compressed air, in accordance with different embodiments of the present disclosure.

FIG. 7 is a flow chart for a high level method 700 for performing fuel vapor purge during boosted engine operating conditions. Performing method 700 may yield the purge flow path (indicated by solid arrow lines 38 and broken arrow lines 39) shown in FIGS. 1-4. Furthermore, method 700 may be enabled by via different embodiments of the present disclosure. As such, method 700 may be performed in response to fuel vapor purging conditions being met when the engine is operating with boost as described with regard to blocks 604 and 606 of method 600.

At 702, method 700 includes metering the compressed air from the intake passage downstream of the compressor and upstream of the throttle in order to provide a desired amount of the compressed air to the canister at a desired pressure and air flow rate for purging while maintaining structural integrity of the canister. For example, metering of the compressed air may be performed by a pressure regulator (such as pressure regulator 40 depicted in FIGS. 1 and 3-5) and may include adjusting the pressure regulator to allow a portion of the air from the compressor to flow into the canister. In some embodiments, metering of the compressed air may be performed by a flow restriction such as a sonic choke depicted in the example embodiment of FIG. 2. In some examples, metering the compressed air may further include restricting the flow of the compressed air via one or more portioning valves—fixed or adjustable, electronically controlled valves, for example. As such, a degree of metering of the compressed air may be based on a pressure difference between an inlet port and an outlet port of the canister.

In one example, a pulse-width modulated valve may be utilized to regulate flow of compressed air into the canister. The pulse-width modulated valve may be located in the inlet line coupling the first intake passage downstream of the compressor and upstream of the throttle with the inlet port of canister. During purging, an opening amount of the pulse-width modulated valve may be adjusted continuously based on a pressure difference between the inlet port and the outlet port of the canister, the pressure difference determined based on an inlet port pressure sensor and an outlet port pressure sensor.

In some examples, the compressed air may be cooled via a charge air cooler in the first intake passage before metering.

Next, at 704, method 700 includes purging the fuel vapor canister with metered compressed air. Purging the fuel vapor canister may include directing the metered compressed air into the canister for desorbing fuel vapors, and then delivering the purge gases comprising the desorbed fuel vapors and air to a location upstream of the compressor in the second intake passage. The purging operation may be enabled by opening a CPV (such as CPV 174 at FIGS. 1-5), closing a CVV (such as CVV 134 at FIGS. 1, 2, and 4, or solenoid valve 133 at FIGS. 3 and 5), and closing a VBV (such as VBV 124 at FIGS. 1-5) at 706. In one embodiment, such as the example embodiment depicted at FIG. 4, enabling the purging operation may further include adjusting a three-way valve (at 708), such as three-way valve 24, to flow the purge gases from the outlet port of the canister to a first purge conduit (such as purge conduit 25 at FIG. 4) and subsequently to a second intake passage (such as second intake passage 42) upstream of the compressor via the CPV. In another embodiment, such as the example embodiment depicted at FIG. 5, purging the canister may further include, at 708, adjusting a three-way valve (such as three-way valve 55) to couple the canister to the first intake passage via the inlet line (such as inlet line 29). In this way, metered compressed intake air may be flown from the first intake passage downstream of the compressor and upstream of the throttle into the canister, and the purge gases may be flown from the canister to the second intake passage upstream of the compressor via the CPV.

Next, method 700 proceeds to 712. At 712, method 700 includes adjusting a wastegate based on a desired boost. For example, since some of the compressor power is being used for the purging operation, an actual boost may be less than the desired boost. Therefore, in order to achieve the desired boost, a turbine power of an exhaust turbine driving the compressor may be increased by adjusting an opening of the wastegate. For example, by decreasing an opening of the wastegate, an amount of exhaust delivered to the turbine is increased. Consequently, an exhaust manifold pressure and a turbine inlet pressure are increased. This raises the turbine speed and consequently, the turbine power. As a result, the compressor power is increased and hence, the boost is increased.

Upon adjusting the wastegate, method 700 proceeds to 714. At 714, method 700 includes adjusting a CRV (such as CRV 58 at FIGS. 1-5) to move the compressor operation away from a surge line into a non-surge region. For example, a compressor may be subject to unwanted surge when a ratio (herein referred to as compressor pressure ratio) of the outlet pressure to the inlet pressure is high relative to the flow of air through the compressor. In order to reduce compressor surge, an amount of opening of the CRV coupled across the compressor may be increased to increase flow through the compressor and decrease the compressor pressure ratio. In some examples, the wastegate and the CRV may be adjusted concurrently to achieve the desired boost while maintaining compressor operation away from the surge line.

In one example, based on an amount of compressor flow utilized for purging, a degree of aggressiveness of a surge line calibration may be adjusted. For example, during fuel vapor purging with compressed air, a less aggressively calibrated surge line may be utilized so that a portion of compressor power may be utilized for purging while maintaining desired boost.

In this way, compressed air may be metered and utilized for purging fuel vapors stored in the canister.

Figure 8:
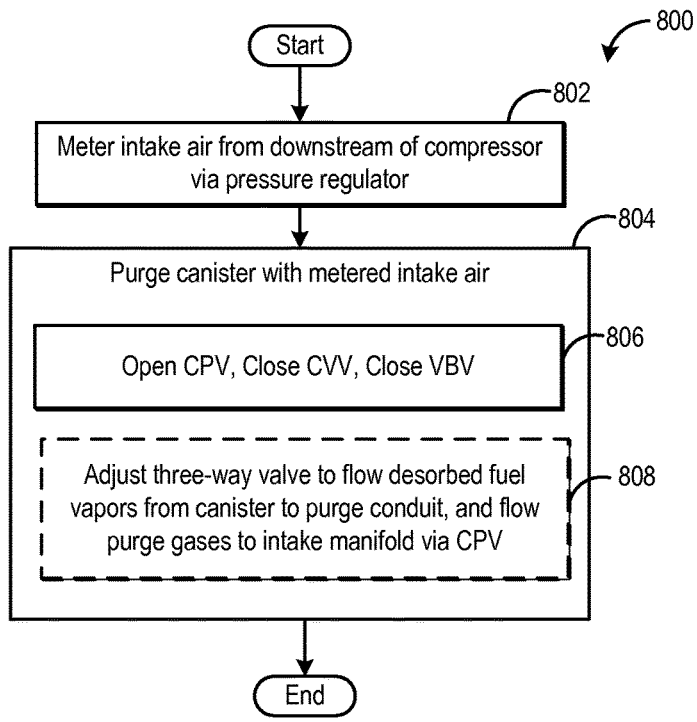
FIG. 8 shows a high level flow chart illustrating an example method for purging a fuel vapor canister by utilizing intake air during a non-boosted engine operating condition, in accordance with different embodiments of the present disclosure.

FIG. 8 is a flow chart for a high level method 800 for performing fuel vapor purge with intake air during non-boosted engine operating conditions. Furthermore, method 800 may be enabled by via different embodiments of the present disclosure. As such, method 800 may be performed in response to fuel vapor purging conditions being met when the engine is operating without boost as described with regard to blocks 604 and 606 of method 600. In some examples, method 800 may be performed in response to one or more of an intake manifold vacuum being greater than a second threshold, and a difference between a TIP and a MAP being greater than a threshold difference during the non-boosted purging conditions discussed above.

At 802, method 800 includes metering the intake air from the intake passage downstream of the compressor and upstream of the throttle via the pressure regulator in order to provide a desired amount of the intake air to the canister at a desired pressure and air flow rate for purging. For example, metering the intake air may include adjusting the pressure regulator or a flow regulator to allow a portion of the intake air from the intake passage downstream of the compressor to flow into the canister. Metering the compressed air may further include restricting the flow of the intake air via one or more portioning valves—fixed or adjustable, electronically controlled valves, for example.

In one example, a pulse-width modulated valve may be utilized to regulate flow of intake air into the canister. The pulse-width modulated valve may be located in the conduit coupling the intake passage downstream of the compressor and upstream of the throttle with the inlet port of canister. During purging, an opening amount of the pulse-width modulated valve may be adjusted continuously based on a pressure difference between the inlet port and the outlet port of the canister, the pressure difference determined based on an inlet port pressure sensor and an outlet port pressure sensor.

In some examples, the intake air may be cooled via a charge air cooler in the intake passage before the metering.

Next, at 804, method 800 includes purging the fuel vapor canister with metered intake air. Purging the fuel vapor canister may include directing the metered intake air from the intake passage downstream of the compressor and upstream of the throttle into the canister for desorbing fuel vapors, and then delivering the purge gases comprising the desorbed fuel vapors and air to the intake manifold downstream of the throttle. In this example, intake manifold vacuum is utilized to draw intake air through the canister and deliver the purge gases to the intake manifold. The purging operation may be enabled by opening a CPV (such as CPV 174 at FIGS. 1-5), closing a CVV (such as CVV 134 at FIGS. 1, 2, and 4, or solenoid valve 133 at FIGS. 3 and 5), and closing a VBV (such as VBV 124 at FIGS. 1-5) at 806. In one embodiment, such as the example embodiment depicted at FIG. 4, enabling the purging operation may further include, at 808, adjusting a three-way valve (such as three-way valve 24) to flow the purge gases from the outlet port of the canister to a purge conduit (such as purge conduit 25) and subsequently to an intake manifold (such as intake manifold 44) via the CPV. In another embodiment, such as the example embodiment depicted at FIG. 5, purging the canister may further include, at 808, adjusting a three-way valve, such as three-way valve 55 to couple the canister to first intake passage via the inlet line. In this way, during purging under non-boosted conditions, (un-compressed) intake air may be flown from the intake passage downstream of the compressor and upstream of the throttle into the canister, and the purge gases may be flown from the canister to the intake manifold.

In this way, by utilizing intake air for purging even during non-boosted conditions, a desired combustion air-fuel ratio may be maintained without reducing fuel economy. However, in some examples, when the intake vacuum or the pressure difference between TIP and MAP is not available to draw intake air from the intake passage between the compressor and the throttle, ambient air may be utilized for purging as described below with respect to FIG. 9.

Figure 9:
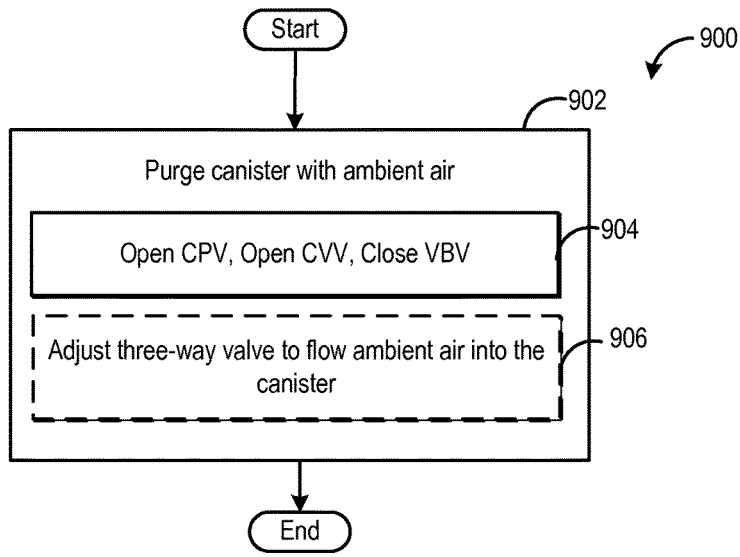
FIG. 9 shows a high level flow chart illustrating an example method for purging a fuel vapor canister by utilizing ambient air during a non-boosted engine operating condition, in accordance an embodiment of the present disclosure.

FIG. 9 is a flow chart for a high level method 900 for performing fuel vapor purge with ambient air during selected non-boosted engine operating conditions. Method 900 may be enabled by different embodiments of the present disclosure (such as the example embodiments discussed with respect to FIGS. 1 and 5). As such, method 900 may be performed in response to fuel vapor purging conditions being met when the engine is operating without boost as described with regard to blocks 604 and 606 of method 600, and further in response to one or more of an intake manifold vacuum being less than a second threshold, and/or a difference between a TIP and a MAP being less than a threshold difference.

At 902, method 900 includes purging the fuel vapor canister with ambient air. Purging the fuel vapor canister may include directing the ambient intake air from the atmosphere into the canister for desorbing fuel vapors, and then delivering the purge gases comprising the desorbed fuel vapors and air to the intake manifold downstream of the throttle. In this example, intake manifold vacuum is utilized to draw ambient air through the canister and deliver the purge gases to the intake manifold. The purging operation may be enabled by opening the CPV at 904. Further, at 904, the VBV may be closed and the CVV may be opened. In some embodiments, such as the example embodiment at FIG. 5, purging the canister with ambient air may further include adjusting a three-way valve (such as three-way valve 55 at FIG. 5 located within vent line 27) to operate in a second conformation to flow ambient air from the atmosphere into the canister. As such, in a first conformation, the three-way valve may allow flow of compressed or uncompressed intake air from the intake passage between the compressor and the throttle into the canister via the inlet line.

In this way, fuel vapor purging may be performed by utilizing ambient air when sufficient intake manifold vacuum or sufficient pressure difference between the TIP and MAP is not available to draw intake air from the intake passage for purging.

The system described herein and with regard to FIGS. 1-5, along with the methods described herein and with regard to FIGS. 6-9 may enable one or more systems and one or more methods.

In one example, a method for a boosted engine, comprises: during purging a fuel vapor canister, during a boosted condition, flowing intake air from a first intake passage downstream of a compressor into the canister, and delivering purge gases from the canister to a second intake passage upstream of the compressor; and during a non-boosted condition, flowing compressed air from the first intake passage into the canister, and delivering the purge gases to an engine intake manifold. The method further comprises regulating air flow from the first intake passage via a pressure regulator during the boosted condition and the non-boosted condition. The method further comprises during the boosted condition, adjusting a wastegate based on a desired boost, the wastegate coupled across an exhaust turbine driving the compressor. The method further comprises during the boosted condition, adjusting a compressor recirculation valve based on a compressor surge limit and an amount of purge gases delivered during purging. The method includes wherein delivering the purge gases to the intake manifold comprises: flowing the purge gases from the canister into a first purge conduit; and flowing the purge gases from the first purge conduit into a second purge conduit before delivering the purge gases to the intake manifold. The method further includes wherein delivering the purge gases to the upstream of the compressor comprises: flowing the purge gases from the canister into the first purge conduit, and flowing the purge gases from the first purge conduit into a third purge conduit before delivering the purge gases to the upstream of the compressor. Still further, the method includes wherein the purging comprises: opening a canister purge valve coupled within the first purge conduit, closing a canister vent valve coupled within a vent line coupling the canister with atmosphere, and closing a vapor blocking valve coupling the canister and a fuel tank. The method further comprises during a refueling event, opening the canister vent valve coupled within the vent line to fluidically couple the canister to the atmosphere, and venting the fuel tank to the atmosphere via the vent line. Further, during the refueling event, the method includes opening the vapor blocking valve and closing the purge valve. The method further includes wherein the air flow from the intake to the canister during both the non-boosted and the boosted condition is regulated based on a pressure difference between a canister inlet port and the canister outlet port.

In another example, a method for a boosted engine, may comprise: during purging a fuel vapor canister, opening a canister purge valve located within a first purge conduit, the first conduit coupled to an outlet port of the canister; regulating air flow from a first intake passage of the engine downstream of a compressor and upstream of an intake throttle into the canister; flowing purge gases from the outlet port of the canister to a junction downstream of the purge valve via the first purge conduit; during a first condition, directing the purge gas flow at the junction to a second intake passage upstream of compressor; and during a second condition, directing the purge gas flow at the junction to an engine intake manifold. The method includes wherein the first condition includes a boosted engine operating condition; and wherein the second condition includes a non-boosted engine operating condition and an intake manifold vacuum greater than a threshold. The method further includes wherein the regulation of the air flow is performed by a pressure regulator coupled within an inlet line coupling the intake passage with an inlet port of the canister. The method further comprises during a third condition, flowing fresh air from the atmosphere into the canister via a vent line, flowing the purge gases from the outlet port of the canister to the junction via the purge valve through the first purge conduit, and directing the purge gas flow at the junction into the intake manifold. The method further includes wherein the third condition includes a non-boosted engine operating condition and the intake manifold vacuum below the threshold. The method further comprises: during a fourth condition including a refueling event, opening a vapor blocking valve coupling a fuel tank with a fuel vapor inlet port of the canister, closing the purge valve, and opening a canister vent valve coupled within the vent line. Still further, the method includes during the first and the second conditions, closing the canister vent valve, and closing the vapor blocking valve.

Turning to FIG. 10, an example table 1000 indicating positions of one or more valves including a CPV, a VBV, and a CVV during various modes of engine operation and according to the different embodiments of the present disclosure is shown. Specifically, row 1002 shows positions of a CPV (such as CPV 174), a VBV (such as VBV 124), and a CVV (such as CVV 134 or solenoid valve 133) according to embodiments depicted in FIGS. 1-3; row 1004 shows positions of a CPV (such as CPV 174), a VBV (such as VBV 124), a CVV (such as CVV 134), and a three-way valve (such as three-way valve 24) according to the embodiment depicted in FIG. 4; and row 1006 shows positions of a CPV (such as CPV 174), a VBV (such as VBV 124), and a CVV (such as solenoid valve 133), and a three-way valve (such as three-way valve 55) according to the embodiment depicted in FIG. 5. Vertical columns 1001, 1003, 1005, 1007, and 1009 indicate different engine operating conditions such as purging with compressed air during boosted conditions, purging with un-compressed intake air during non-boosted conditions, purging with ambient air during non-boosted conditions, fuel vapor storage and refueling conditions, and evaporative emissions leak test conditions.

Note that the example control and estimation routines included herein can be used with various engine and/or vehicle system conformations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the conformations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and conformations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
   during purging a fuel vapor canister,
      during a boosted condition, flowing compressed air from a first intake passage downstream of a compressor into the canister, and delivering purge gases from the canister to a second intake passage upstream of the compressor; and
      during a non-boosted condition, flowing un-compressed air from the first intake passage into the canister, and delivering the purge gases to an engine intake manifold.

2. The method of claim 1, further comprising:
   regulating air flow from the first intake passage via a pressure regulator during the boosted condition and the non-boosted condition.

3. The method of claim 2, further comprising:
   during the boosted condition, adjusting a wastegate based on a desired boost, the wastegate coupled across an exhaust turbine driving the compressor.

4. The method of claim 3, further comprising:
   during the boosted condition, adjusting a compressor recirculation valve based on a compressor surge limit and an amount of purge gases delivered during purging.

5. The method of claim 2, wherein delivering the purge gases to the intake manifold comprises: flowing the purge gases from the canister into a first purge conduit; and flowing the purge gases from the first purge conduit into a second purge conduit before delivering the purge gases to the intake manifold.

6. The method of claim 5, wherein delivering the purge gases to the upstream of the compressor comprises: flowing the purge gases from the canister into the first purge conduit, and flowing the purge gases from the first purge conduit into a third purge conduit before delivering the purge gases to the upstream of the compressor.

7. The method of claim 6, wherein the purging comprises: opening a canister purge valve coupled within the first purge conduit, closing a canister vent valve coupled within a vent line coupling the canister with atmosphere, and closing a vapor blocking valve coupling the canister and a fuel tank.

8. The method of claim 7, further comprising:
during a refueling event, opening the canister vent valve coupled within the vent line to fluidically couple the canister to the atmosphere, and venting the fuel tank to the atmosphere via the vent line.

9. The method of claim 8, further comprising:
during the refueling event, opening the vapor blocking valve and closing the purge valve.

10. The method of claim 2, wherein the air flow from the intake to the canister during both the non-boosted and the boosted condition is regulated based on a pressure difference between a canister inlet port and the canister outlet port.

11. A method for a boosted engine, comprising:
during purging a fuel vapor canister,
opening a canister purge valve located within a first purge conduit, the first conduit coupled to an outlet port of the canister;
regulating air flow from a first intake passage of the engine downstream of a compressor and upstream of an intake throttle into the canister;
flowing purge gases from the outlet port of the canister to a junction downstream of the purge valve via the first purge conduit;
during a first condition, directing the purge gas flow at the junction to a second intake passage upstream of compressor; and
during a second condition, directing the purge gas flow at the junction to an engine intake manifold.

12. The method of claim 11, wherein the first condition includes a boosted engine operating condition; and wherein the second condition includes a non-boosted engine operating condition and an intake manifold vacuum greater than a threshold.

13. The method of claim 12, wherein the regulation of the air flow is performed by a pressure regulator coupled within an inlet line coupling the intake passage with an inlet port of the canister.

14. The method of claim 13, further comprising:
during a third condition, flowing fresh air from the atmosphere into the canister via a vent line, flowing the purge gases from the outlet port of the canister to the junction via the purge valve through the first purge conduit, and directing the purge gas flow at the junction into the intake manifold.

15. The method of claim 14, wherein the third condition includes a non-boosted engine operating condition and the intake manifold vacuum below the threshold.

16. The method of claim 15, further comprising:
during a fourth condition including a refueling event, opening a vapor blocking valve coupling a fuel tank with an fuel vapor inlet port of the canister, closing the purge valve, and opening a canister vent valve coupled within the vent line.

17. The method of claim 16, further comprising: during the first and the second conditions, closing the canister vent valve, and closing the vapor blocking valve.

18. A vehicle system, comprising:
a boosted engine;
a fuel tank;
a fuel vapor canister;
an inlet line coupling a first intake passage downstream of a compressor of the engine and upstream of an intake throttle to an inlet port of the canister;
a first purge conduit coupling an outlet port of the canister to a node;
a canister purge valve coupled within the first purge conduit;
a second purge conduit coupling the node to an intake manifold;
a third purge conduit coupling the node to a second intake passage upstream of the compressor;
a vent line coupling the outlet port of the canister to ambient air;
a canister vent valve coupled within the vent line; and
a controller having executable instructions stored in a non-transitory memory for:
when canister purge conditions are met,
during a boosted condition, drawing compressed air through the canister from the first intake passage via the inlet line, and flowing purge gases to the second intake passage via the first purge conduit and the third purge conduit; and
during a non-boosted condition, drawing intake air through the canister from the first intake passage via the inlet line, and flowing purge gases to the intake manifold via the first purge conduit and the second purge conduit.

19. The system of claim 18, wherein the controller includes further instructions for, during a refueling condition, flowing fuel vapors from a fuel tank into the canister, and flowing vent gases stripped of fuel vapors from the canister to the second intake passage via vent line and a conduit coupling the vent line with the second intake passage.

20. The system of claim 18, wherein the controller includes further instructions for regulating flow of air into the canister via a pressure regulator located in the inlet line when the purging conditions are met, and for adjusting a wastegate coupled across an exhaust turbine driving the compressor based on a desired boost during the purging.

* * * * *